United States Patent
Chen et al.

(10) Patent No.: US 7,550,029 B2
(45) Date of Patent: Jun. 23, 2009

(54) RECYCLING METHOD FOR AL—$B_4C$ COMPOSITE MATERIALS

(75) Inventors: Xiao-Guang Chen, Jonquière (CA); Jean-Yves Fortin, Jonquière (CA)

(73) Assignee: Alcan International Limited, Montreal, Quebec (CA)

( * ) Notice: Subject to any disclaimer, the term of this patent is extended or adjusted under 35 U.S.C. 154(b) by 197 days.

(21) Appl. No.: 11/568,164

(22) PCT Filed: Apr. 21, 2005

(86) PCT No.: PCT/CA2005/000609

§ 371 (c)(1), (2), (4) Date: Jun. 6, 2007

(87) PCT Pub. No.: WO2005/103311

PCT Pub. Date: Nov. 3, 2005

(65) Prior Publication Data

US 2008/0034923 A1    Feb. 14, 2008

Related U.S. Application Data

(60) Provisional application No. 60/564,918, filed on Apr. 22, 2004.

(51) Int. Cl.
*C22B 21/06* (2006.01)
*C22B 7/00* (2006.01)
(52) U.S. Cl. .......................... 75/687; 420/590; 148/688
(58) Field of Classification Search .................. None
See application file for complete search history.

(56) References Cited

U.S. PATENT DOCUMENTS 3,356,618 A    12/1967    Rich et al.
3,503,738 A *  3/1970    Cooper .................. 420/528
3,955,970 A    5/1976    Claxton et al.

(Continued)

FOREIGN PATENT DOCUMENTS

CA    2357323    3/2002

(Continued)

OTHER PUBLICATIONS

Machine translation of JP 08-262192A published Oct. 1996.*

(Continued)

*Primary Examiner*—Roy King
*Assistant Examiner*—Tima M McGuthry-Banks
(74) *Attorney, Agent, or Firm*—Banner & Witcoff, Ltd.

(57) ABSTRACT

A method is described for reclaiming an Al—$B_4C$ composite scrap material. The method involves heating a liquid pool of molten aluminum while also pre-heating the scrap material. The scrap material is then added to the molten aluminum and a predetermined melt temperature is maintained in the liquid pool until all of the scrap material melts into the molten aluminum to form a resultant composite melt. Finally, the resultant composite melt is stirred to promote uniformity. A method is also described for preparing a $B_4C$-containing aluminum cast composite products that involves preparing a mixture of free-flowing $B_4C$ particles and molten aluminum and stirring the mixture to wet the aluminum to the $B_4C$ particles. The mixture is then cast into a cast composite material and processed to form the cast composite product and Al—$B_4C$ composite scrap material. The scrap material is then reclaimed by the method described above.

8 Claims, 3 Drawing Sheets

U.S. PATENT DOCUMENTS

| | | | |
|---|---|---|---|
| 4,571,258 A | | 2/1986 | Bamji et al. |
| 4,595,559 A | * | 6/1986 | Planchamp .................. 420/528 |
| 4,759,995 A | | 7/1988 | Skibo et al. |
| 4,786,467 A | | 11/1988 | Skibo et al. |
| 4,992,241 A | | 2/1991 | Provencher et al. |
| 5,076,340 A | | 12/1991 | Bruski et al. |
| 5,083,602 A | | 1/1992 | Skibo |
| 5,122,181 A | | 6/1992 | Dube et al. |
| 5,186,234 A | | 2/1993 | Hammond et al. |
| 5,246,057 A | | 9/1993 | Hannson et al. |
| 5,394,928 A | | 3/1995 | Hammond et al. |
| 5,521,016 A | | 5/1996 | Pyzik et al. |
| 5,700,962 A | | 12/1997 | Carden |
| 5,722,033 A | | 2/1998 | Carden |
| 5,858,460 A | | 1/1999 | Ferrando et al. |
| 5,965,829 A | | 10/1999 | Haynes et al. |
| 6,223,805 B1 | * | 5/2001 | Banning et al. ................ 164/97 |
| 6,284,014 B1 | | 9/2001 | Carden |
| 7,125,515 B2 | * | 10/2006 | Aruga et al. ................. 420/528 |

FOREIGN PATENT DOCUMENTS

| | | |
|---|---|---|
| EP | 0608299 | 12/1995 |
| JP | 08262192 A * | 10/1996 |
| WO | 0026921 | 5/2000 |

OTHER PUBLICATIONS

Lucas, Stephens< Greulich: "The Effect of Reinforcement Stability on Composition Redistribution in Cast Aluminum Metal Matrix Composites", Materials Science and Engineering, No. A131 (1991), pp. 221-230, XP002270490 USA.

Kennedy, Brampton: "The Reactive Wetting and Incorporation of BAC Particles into Molten Aluminum", Scripta Materialia, No. 44 (2001), pp. 1077-1082, XP002270491 UK.

Chernyshova, Rebrov: "Interaction Kinetics of Boron Carbide and Silicon Carbide with Liquid Aluminum", Journal of the Less Common Metals, No. 117 (1986), pp. 203-207, XP002270492 Russia.

* cited by examiner

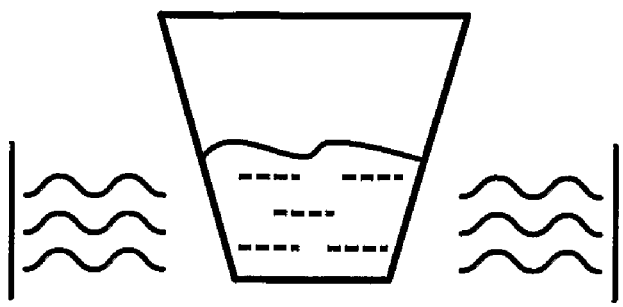
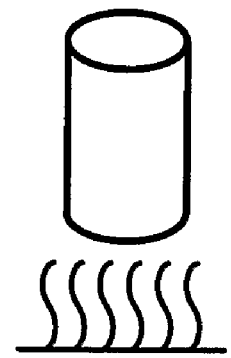
FIG. 1A  FIG. 1B
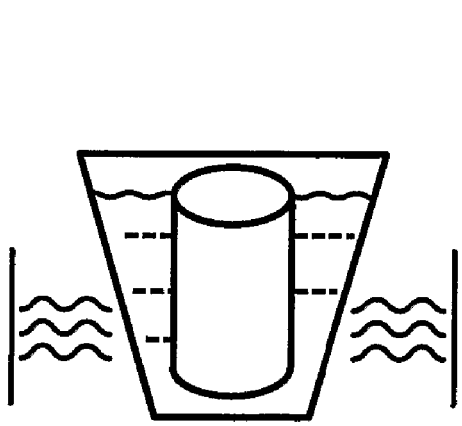
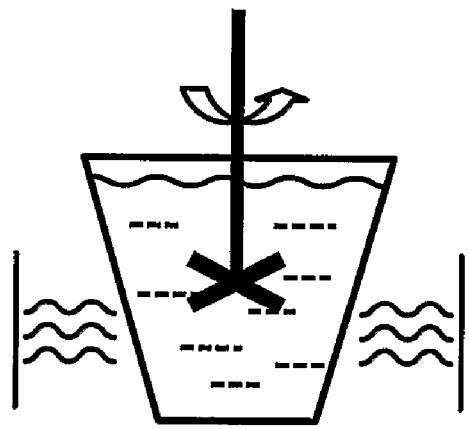
FIG. 1C  FIG. 1D

RECYCLING METHOD FOR AL—$B_4C$ COMPOSITE MATERIALS

CROSS REFERENCE TO RELATED APPLICATIONS

This application claims the benefit of priority of the filing date of 21 Apr. 2005 of (1) a Patent Cooperation Treaty patent application, Ser. No. PCT/CA2005/000609, filed on the aforementioned date, the entire contents of which are incorporated herein by reference, wherein Patent Cooperation Treaty patent application Ser. No. PCT/CA2005/000609 was published under PCT Article 21(2) in English, and (2) the filing date of 22 Apr. 2004 of U.S. provisional patent application, Ser. No. 60/564,918, filed on the aforementioned date, the entire contents of which are incorporated herein by reference.

TECHNICAL FIELD

The present invention relates to methods for recycling boron-based neutron absorber materials, and in particular Al—$B_4C$ composite scrap materials.

BACKGROUND ART

There is a great interest in the nuclear energy industry for construction materials which will absorb, and therefore not release, neutrons, e.g. in containers for waste fuel. These containers are predominantly made of aluminum (Al)-based materials, and boron (B) is a commonly used element for neutron absorbing. Boron can be typically incorporated into Al as $B_4C$, $TiB_2$ or simply B that forms $AlB_2$ or $AlB_{12}$ in an Al-matrix.

The manufacture processes for making such storage containers includes methods of direct chill (DC) casting, extrusion and rolling. These methods quite often produce process scraps of Al—$B_4C$ composite materials that can make up to 65% of the original source material.

In the interest of economic savings and waste reduction, it is therefore of great interest to find a way to reclaim the valuable process scrap. However, $B_4C$ particles tend to be thermodynamically unstable in liquid aluminum, causing interfacial reactions between $B_4C$ and Al. This significantly reduces the fluidity and castability of the liquid composite during remelting, making the process of reclaiming scrap materials and their subsequent casting extremely difficult.

Boron-containing, aluminum materials are also highly reactive in the molten state, and the reactivity is strongly temperature and time dependent. Therefore, in attempts to recycle the scrap material by simply melting, the surface temperature of the scrap becomes elevated (e.g. more than about 770° C.), resulting in the $B_4C$-containing refractory reacting with the aluminum matrix, rendering the material useless for subsequent casting, as fluidity becomes reduced.

Attempts to combine "virgin", or unused, cast composite material and composite scrap materials have also been unsuccessful since the virgin cast composite has to be heated to a relatively high temperature to permit a reasonable quantity of scrap to be incorporated into the melt within a reasonable time. This heating tends to cause the virgin composite to deteriorate.

Alternately, the temperature of the virgin composite can be kept at a lower level, but in this case, the incorporation rate of scrap material must be reduced, resulting in an increase in the time needed to recycle a given quantity of scrap material, and again the material tends to deteriorate.

U.S. Pat. No. 3,955,970 (Claxton et al.) teaches a continuous melting process involving submerging scrap material into molten aluminum at ratios of from 1:10 to 1:50 scrap material to molten aluminum. Stirring is used to incorporate the solid scrap into the molten aluminum. There is no specific teaching of ways to prevent reactions between the $B_4C$ in the scrap material and the molten aluminum matrix. U.S. Pat. No. 4,571,258 also teaches a method of reclaiming scrap material by submergence in molten aluminum, in this case the scrap being light gauge aluminium. This patent is silent on dealing with scrap material that contains $B_4C$ and methods of preventing $B_4C$ degradation or reaction with molten aluminum.

U.S. Pat. No. 6,223,805 describes a method for recycling metal matrix composites and includes, as options, mixing of the composite with "virgin" composite or with matrix metal. The patent focuses on a method of eliminating inclusions in the recycled material.

It is therefore highly desirable to establish a method of reclaiming Al—$B_4C$ composite scrap material while maintaining integrity of the $B_4C$ and fluidity in the resultant composite product.

DISCLOSURE OF INVENTION

The present invention creates a unique way to reclaim Al—$B_4C$ composite scrap material and to remelt Al—$B_4C$ composite materials for shape casting.

The present invention thus provides a method for reclaiming an Al—$B_4C$ composite scrap material that comprises heating a liquid pool of molten aluminum to a predefined pool temperature while also pre-heating the scrap material to a predefined pre-heat temperature. Next the pre-heated scrap material is added to the molten aluminum in a mass ratio of from 0.3:0.7 to 0.7:0.3 scrap material to molten aluminum. A predetermined melt temperature is maintained in the liquid pool until all of the scrap material melts into the molten aluminum, to form a resultant composite melt and finally, the resultant composite melt is stirred to promote uniformity.

The present invention also provides a method of preparing a $B_4C$-containing aluminum cast composite product that involves preparing a mixture of free-flowing $B_4C$ particles and molten aluminum by dispersing the $B_4C$ particles in molten aluminum alloy and stirring the mixture to wet the aluminum to the $B_4C$ particles. The mixture is then cast into a cast composite material and further processed into products which generates Al—$B_4C$ composite scrap material. The scrap is then reclaimed by heating a liquid pool of molten aluminum to a predefined pool temperature while also pre-heating the scrap material to a predefined pre-heat temperature. The pre-heated scrap material is added to the molten aluminum in a mass ratio of from 0.3:0.7 to 0.7:0.3 scrap material to molten aluminum and a predetermined melt temperature is maintained in the liquid pool until all of the scrap material melts into the molten aluminum to form a resultant composite melt. Finally, the resultant composite melt is stirred to promote uniformity and cast as a new cast product.

BRIEF DESCRIPTION OF DRAWINGS

The present invention will be described in conjunction with the following figures:

FIGS. 1A, 1B, 1C and 1D are schematic diagrams showing the steps involved in the method of the present invention;

BEST MODES FOR CARRYING OUT THE INVENTION

Figure 2:
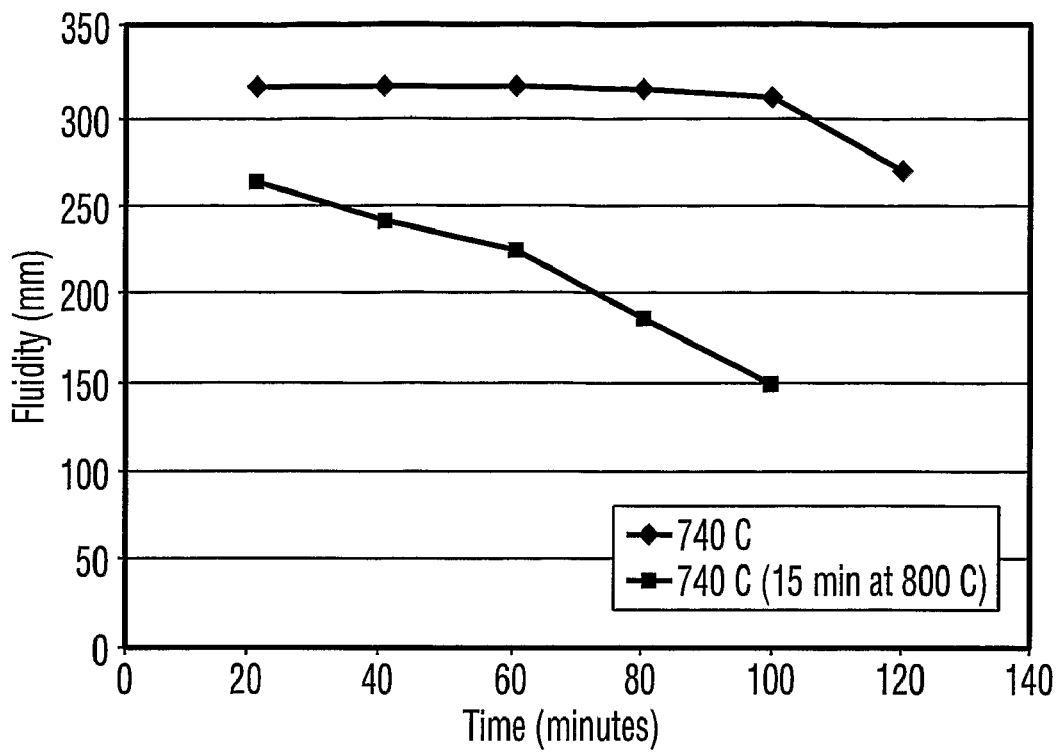
FIG. 2 is a plot of composite fluidity vs. time illustrating the effect of a short overheat on fluidity.

The present invention focuses on improving the quantity and quality of boron-containing aluminum scrap material that can be reclaimed for reuse.

To date, several approaches to reclaiming scrap material have been proposed and tested on laboratory scale. Some of these approaches are outlined in Table I. As seen in the table, the replacing and remelting methods are very sensitive to the melt temperature and duration. Local overheating and long melting times can cause loss of fluidity and general $B_4C$ deterioration.

TABLE I

| Approach | Process | Observation |
| --- | --- | --- |
| Replacing | ⅔ new liquid composite + ⅓ scrap | $B_4C$ degradation and poor fluidity due to long processing time. |
| Remelting | Direct remelting of scrap material | $B_4C$ degradation and poor fluidity due to long melting time and local overheating. |
| Diluting | 0.3-0.7 new Al liquid pool + 0.7-0.3 scrap | Good fluidity due to short melting time - fluidity improves if Ti is present in the new Al liquid pool. |

The dilution approach, by contrast, has shown good results in remelting and recycling scrap Al—$B_4C$ materials.

In the present invention, a molten aluminum alloy is provided at a temperature determined by the desired scrap incorporation rate and so that the temperature of the mixture after incorporation, melting and mixing of the scrap does not allow for $B_4C$ degradation.

Thus, according to one aspect of the present invention there is provided a method for reclaiming an Al—$B_4C$ composite scrap material having a degradation temperature at and above which degradation of the composite commences, comprising: heating a liquid pool of molten aluminum to a predefined pool temperature; pre-heating the scrap material to a predefined pre-heat temperature below said degradation temperature; adding the pre-heated scrap material to the molten aluminum in a mass ratio of from 0.3:0.7 to 0.7:0.3 scrap material to molten aluminum; maintaining a predetermined melt temperature in the liquid pool below said degradation temperature until all of the scrap material melts into the molten aluminum to form a resultant composite melt; and stirring the resultant composite melt to promote uniformity.

According to another aspect of the present invention there is provided a method of preparing a $B_4C$ containing aluminum cast composite products comprising: preparing a mixture of free flowing $B_4C$ particles and molten aluminum by dispersing the $B_4C$ particles in molten aluminum alloy; stirring the mixture to wet the aluminum to the $B_4C$ particles; casting the mixture into a cast composite material having a degradation temperature at and above which degradation of the composite commences; processing the cast composite material to form products and resulting Al—$B_4C$ composite scrap material; heating a liquid pool of molten aluminum to a predefined pool temperature; pre-heating the scrap material to a predefined pre-heat temperature below said degradation temperature; adding the pre-heated scrap material to the molten aluminum in a mass ratio of from 0.3:0.7 to 0.7:0.3 scrap material to molten aluminum; maintaining a predetermined melt temperature in the liquid pool below said degradation temperature until all of the scrap material melts into the molten aluminum to form a resultant composite melt; and stirring the resultant composite melt to promote uniformity and casting as a further cast composite product.

The dilution process consists of four basic steps, which are illustrated in FIGS. 1A, 1B, 1C and 1D. Firstly, as seen in FIG. 1A, a liquid pool of molten aluminum is formed in a quantity that will make up 0.3 to 0.7 of the total melt after incorporation of the scrap material. The curved lines shown in the drawing represent heating applied to the container. Next, scrap material, preferably in the form of an Al—$B_4C$ block as seen in FIG. 1B, is preheated to a predetermined temperature. The preheated block of scrap material is added to the molten aluminum and allowed to melt, as seen in FIG. 1C, until the block totally melts in the liquid pool. Finally, as shown in FIG. 1D, the resultant composite melt is stirred to form a uniform composite product. Stirring aids to shorten process time, but is only conducted after the entire scrap has melted.

By controlling the temperature of the liquid pool there is no risk of overheating Al—$B_4C$ material and causing undesirable material degradation. As well, the relatively short melting time required prevents the chance of reactions between $B_4C$ and aluminum. Any simple furnace and equipment well known in the art can be used to carry out the present invention and still provide excellent fluidity and castability. In turn, ease of castability leads to less time required for casting.

The temperature of the molten aluminum before adding the scrap material, and the temperature of the pre-heated block of scrap material should be such that the temperature of the resultant composite melt (that is, the molten aluminum alloy from the original bath plus the matrix alloy from the scrap and any boron carbide particles dispersed in the molten composite) is preferably less than 770° C. and more preferable below 740° C., but more than the solidus, and preferably more than the liquidus temperature. Preferably, the block of $B_4C$-containing scrap material is preheated to a temperature of less than 600° C., more preferable below 500° C. Based on these requirements, it can be seen that the temperature of the molten aluminum alloy in the original bath may have to be elevated to achieve the final balance temperature with the amount of scrap added. For this reason, a process involving unused cast composite material as the original bath is not viable. To ensure that heat is transferred quickly though the mixture while melting it is important to have liquid metal present in the mixture at all times and therefore the temperature of the mixture should be maintained above its solidus and more preferably above its liquidus temperature.

Figure 3:
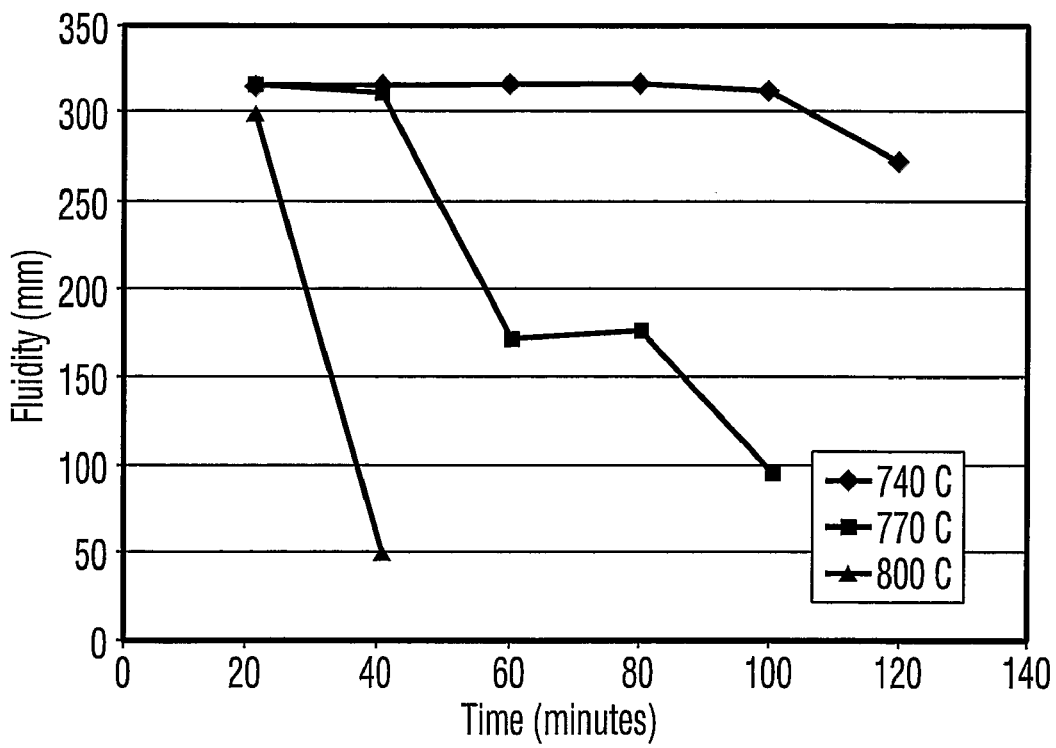
FIG. 3 is a plot of composite fluidity vs. time illustrating the effect of holding temperature on fluidity.

The importance of this temperature control is shown in FIGS. 2 and 3 which are plots of composite fluidity, measured by the distance that the composite will travel up a linear mould of specific design, versus holding time. It is clear from FIG. 2 that even a small increase in molten composite temperature above 770° C. has a significant effect on fluidity. Furthermore the plot shows that the alternate approaches summarized in Table 1, such as mixing with new composite material ("replacing") or simple remelting, where the temperature in part will exceed 770° C., will be detrimental to maintaining good fluidity. In FIG. 3, it can be seen that a holding temperature of 770° C. retains acceptable fluidity for at least 40 minutes, which is a minimum useful holding time for casting. Lower temperatures yield much improved stability, and a temperature of 800° C. (i.e. in excess of the preferred upper limit of 770° C.) causes a rapid degradation of fluidity.

It should be noted that the present invention provides a much higher scrap material addition rate than proposed in the prior art. This allows larger quantities of scrap to be reclaimed at a time, providing higher levels of efficiency. Additionally, since the resultant composite product is less diluted than that of submergence methods, less downstream processing is required to meet neutron absorptivity requirements for turning the product into neutron absorbing containers.

The mass ratio of scrap material to molten aluminum is at least 0.3:0.7 and may be as high as 0.7:0.3. This means that the mixture cannot be stirred until the scrap and aluminum have equilibrated, i.e. until all the scrap has melted. The ratio results in a product having sufficient $B_4C$ to be readily useable.

A preferred feature of the invention is the addition of Ti in the range of 0.2 to 5.0%, and more preferable range of 0.5 to 1.5% by weight of titanium to the molten aluminum pool. This improves fluidity of the resulting composite melt and provides further stabilization of $B_4C$ in liquid aluminum.

Figure 4:
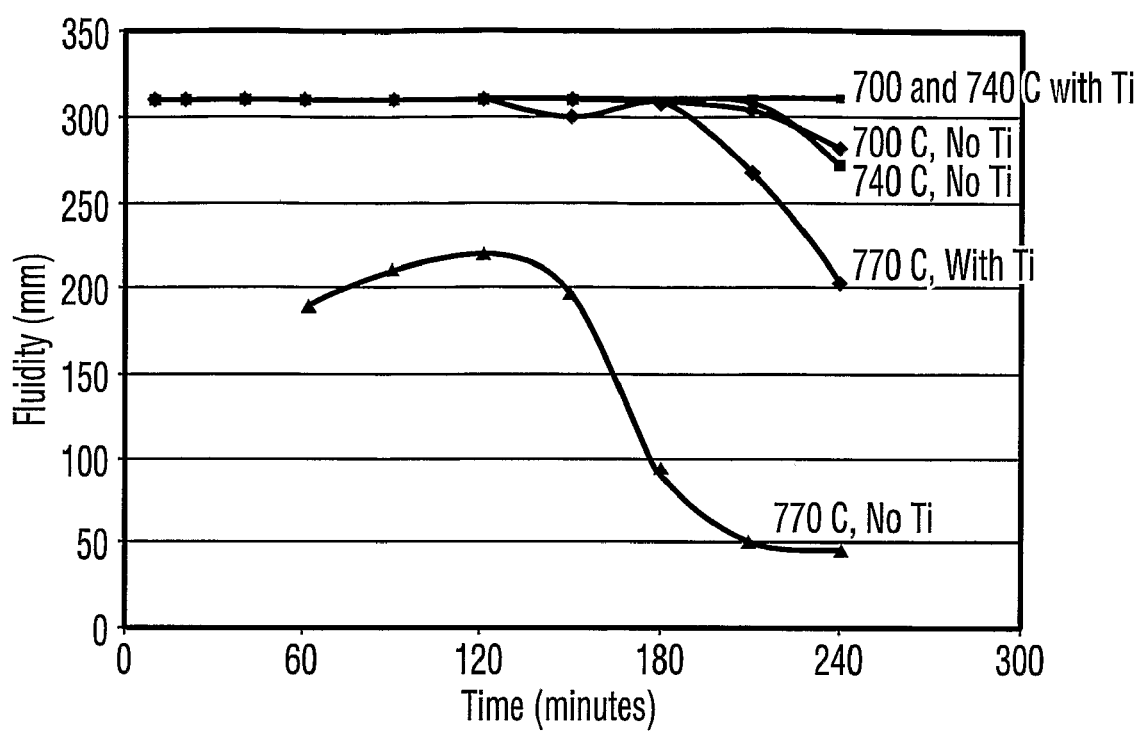
FIG. 4 is a plot of composite fluidity vs. time illustrating the effect of titanium additions on fluidity for different holding temperatures while reclaiming material from 15% to 10% $B_4C$.

FIG. 4 shows a plot of composite fluidity at various holding temperatures with and without Ti additions as a function of time. For holding temperatures of 740° C. or less the addition of Ti enhances the stability of the composite to a small extent. For a holding temperature of 770° C. (the upper preferred limit), addition of Ti has a significant effect on stability.

One characteristic of the process of the present invention is that it is carried out as a batch process. A continuous process, such as those used in typical scrap recycling where scrap is continuously added and product periodically removed, has problems in that it requires that a quantity of already melted Al—$B_4C$ composite be retained at a high temperature for a significant period of time. This invariably leads to undesirable reactions between $B_4C$ and Al, resulting in loss of fluidity and $B_4C$ degradation.

The resultant composite materials produced by the present invention can also be produced as remelting ingots that can be used to manufacture shape castings for neutron absorbing containers in aluminum foundries. Thus, the dilution process can be directly applied to the remelting practice in aluminum foundries.

The resultant product can optionally be modified using known methods to restore and enhance neutron absorptivity to a higher level. For example, additional boron carbide powder can be incorporated by mixing into the fully melted mass provided that such mixing is completed in the a relatively short time between melting and casting, specifically during or immediately following the step of mixing the melted product. The presence of Ti (as in the preferred embodiments of this invention) allows for stabilization of the boron carbide in such mixtures.

This detailed description of the methods and products is used to illustrate the prime embodiment of the present invention. It will be obvious to those skilled in the art that various modifications can be made in the present method and that various alternative embodiments can be utilized. Therefore, it will be recognized that various modifications can be made in both the method and products of the present invention and in the applications to which the method and products are applied without departing from the scope of the invention, which is limited only by the appended claims.

The invention claimed is:

1. A method for reclaiming an Al—$B_4C$ composite scrap material, comprising:
   a) heating a liquid pool of molten aluminum to a predefined pool temperature;
   b) pre-heating the scrap material to a predefined pre-heat temperature;
   c) adding the pre-heated scrap material to the molten aluminum in a mass ratio of from 0.3:0.7 to 0.3:0.7 scrap material to molten aluminum;
   d) maintaining a predetermined melt temperature in the liquid pool until all of the scrap material melts into the molten aluminum to form a resultant composite melt; and
   e) stirring the resultant composite melt to promote uniformity.

2. The method of claim 1 wherein the scrap material is pre-heated to a temperature of less than 600° C.

3. The method of claim 1 wherein the temperature of the combined molten pool of aluminum and melted scrap material is below 770° C.

4. The method of claim 3 wherein the temperature of the combined molten pool of aluminum and melted scrap material is below 740° C.

5. The method of claim 1 wherein the liquid pool of molten aluminum further comprises up to 0.2 to 5% by weight of titanium.

6. The method of claim 5 wherein additional boron carbide powder is added during or following the step of stirring the resulting composite.

7. A method of preparing a $B_4C$-containing aluminum cast composite products comprising:
   a) preparing a mixture of free-flowing $B_4C$ particles and molten aluminum by dispersing the $B_4C$ particles in molten aluminum alloy;
   b) stirring the mixture to wet the aluminum to the $B_4C$ particles;
   c) casting the mixture into a cast composite material;
   d) processing the cast composite material to form products and resulting Al—$B_4C$ composite scrap material;
   e) heating a liquid pool of molten aluminum to a predefined pool temperature;
   f) pre-heating the scrap material to a predefined pre-heat temperature;
   g) adding the pre-heated scrap material to the molten aluminum in a mass ratio of from 0.3:0.7 to 0.7:0.3 scrap material to molten aluminum;
   h) maintaining a predetermined melt temperature in the liquid pool until all of the scrap material melts into the molten aluminum to form a resultant composite melt; and
   i) stirring the resultant composite melt to promote uniformity and casting as a further cast composite product.

8. The method of claim 7 in which additional boron carbide powder is added before casting the further cast composite product but during or following the step of stirring the resultant composite melt.

* * * * *